June 27, 1967 W. H. DUNCAN ET AL 3,327,654
COLLAPSIBLE CARGO PALLET WITH REMOVABLE TOP
Filed March 10, 1966
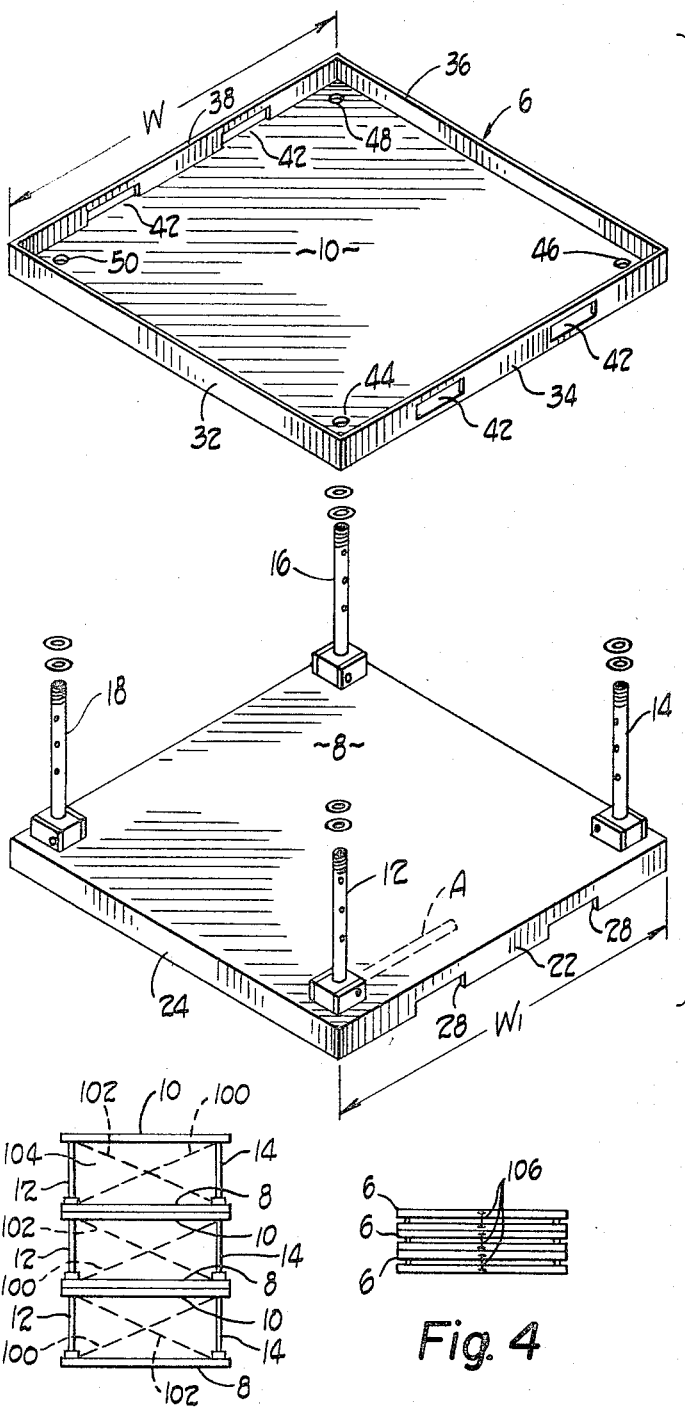
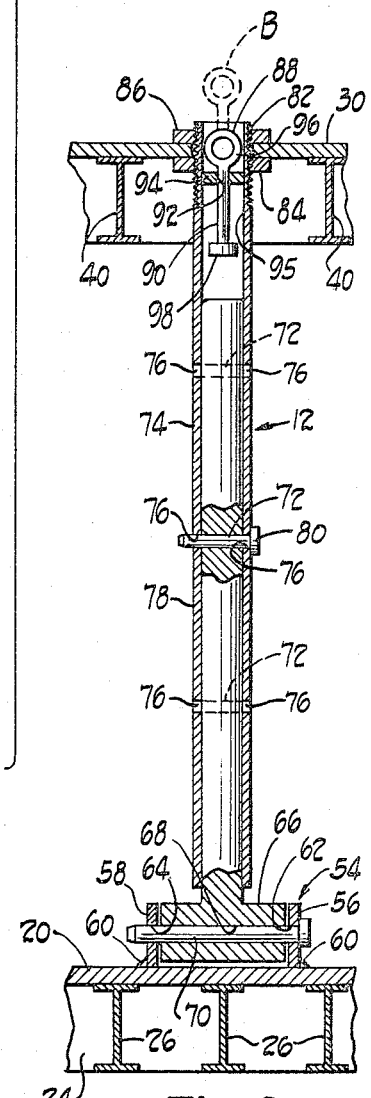
INVENTORS
RALPH F. COOPER
WILLIAM H. DUNCAN
BY Kramer & Stenger
ATTORNEYS United States Patent Office 3,327,654
Patented June 27, 1967

3,327,654
COLLAPSIBLE CARGO PALLET WITH
REMOVABLE TOP
William Henry Duncan and Ralph Frederick Cooper, both of Cleveland, Ohio, assignors to Collapsible Pallet Co., a corporation of Ohio
Filed Mar. 10, 1966, Ser. No. 533,367
6 Claims. (Cl. 108—53)

This invention relates generally to pallets and more particularly to an adjustable pallet which can be nested or stacked when in use, and collapsed when not in use.

The pallets of this invention are particularly well suited for use with crushable or fusible material, e.g. rubber in its natural state. Blobs or lumps of natural rubber, when stacked in large piles, tend to fuse together. The fused lumps of rubber must then be separated by tearing or other suitable means, which is time consuming and costly.

It is desirable, therefore, to stack the pieces of rubber in piles such that the pressure upon the lowermost piece in the pile, is not sufficient to fuse that piece with the next adjacent piece. This can be accomplished by layering the pieces on stacked pallets having means for transferring the weight of the rubber through the pallets rather than through the stacked material. The palletized rubber material is then transported to its destination where the rubber is unloaded from the pallets. The pallets must then be returned for reuse. This is especially true of pallets for transporting natural rubber, as the odor of the rubber is such that it makes the pallets unsuitable for transporting other material. One of the big problems is transporting the empty pallets, as the extended stacked pallets occupy a large amount of usable space, for example, in the hold of a cargo ship. This invention is directed to solving this particular problem as well as providing a pallet which is highly useful in transporting material which is crushable or fusible.

Briefly stated, the invention is in a pallet having at least two spaced material supporting panels or surfaces. A plurality of extensible and retractable arms are collapsibly mounted on one of the panels for supporting the other of said panels. Means are provided for detachably mounting the supported panel on the support arms. The panels can be dimensioned such that a plurality of like extended pallets can be stacked or nested together one on top of the other, the weight of the crushable material on the panels being transferred sequentially to each pallet below, through the support arms. The extended pallets can be broken down by removing the supported panel from the support arms and collapsing the arms. The broken down pallets are then restacked. In this manner, the area occupied by the empty pallets is substantially reduced. Means can also be provided for attaching a ship's gear, e.g. a crane, to the individual pallets for moving them. Other means can also be provided for receiving the lifting arms of conventionally-designed fork lift equipment.

The following description of the invention will be better understood by having reference to the annexed drawing, wherein:

FIG. 1 is an exploded perspective view of an embodiment of the invention;

FIG. 2 is a sectional view showing one of the support arms in cross section mounted between a pair of spaced material supporting panels, portions of which are shown in cross section;

FIG. 3 is a side view showing a plurality of the pallets of FIG. 1 stacked or nested together; and FIG. 4 is a side view showing a plurality of the pallets of FIG. 1 collapsed and stacked together.

Referring generally to the drawing, and more particularly to FIG. 1, there is shown a pallet generally indicated at 6. The pallet 6 comprises a pair of material supporting panels or surfaces 8 and 10 held in preferably parallel relation by a plurality of collapsible, extensible and retractable arms 12–18. The support arms 12–18 are pivotally mounted on the lower panel 8, and used for supporting the upper panel 10.

The lower panel 8 has a rectangular configuration, and comprises a web 20 with surrounding depending flange portions, e.g. flanges 22 and 24. Depending on its size, the lower panel 8 can be reinforced by any suitable means, e.g. conventionally-designed structural members 26 (FIG. 2) secured between the flange for reinforcing the web of the panel. The depending flanges can be provided with openings for receiving pallet-lifting arms of conventionally-designed fork lift equipment, e.g. openings 28 in flange 22.

The upper panel 10 has a rectangular configuration, and comprises a web portion 30 with depending flange portions 32–38. In this particular embodiment of the invention, the depending flanges 32–38 extend from either side of the panel web 30. Similarly, the upper panel 10 can be reinforced by any suitable means, e.g. conventionally-designed structural members 40 secured between the flanges for reinforcing the web of the panel. The depending flanges 32–38 can also be provided with openings for receiving pallet-lifting arms of conventionally-designed fork lift equipment, e.g. openings 42 in flanges 34 and 38. The web 30 of the upper panel 10, is provided with openings 44–50 for receiving the free ends of the telescoping support arms 12–18, respectively.

The following description of the support arms will be in relation to support arm 12 as the arms are similar. It should be understood that any suitable collapsible, telescoping support arm can be used. In this particular embodiment, the support arm 12 (FIG. 2) comprises a pair of arm portions which are movable relative to each other. One arm portion includes a stud 52, which is pivotally mounted on the web 20 of the lower panel 8 by any suitable means, generally indicated at 54. The stud mounting means 54 includes a pair of spaced brackets 56 and 58 which are secured to the web 20 by any suitable means, e.g. welds 60. The brackets 56 and 58 are provided with pin receiving openings 62 and 64, respectively.

The stud 52 is integrally formed with, and extends from a base portion 66. The base portion 66 is also provided with a pin receiving slot or opening 68. The stud 52 is rotatably mounted between the brackets 56 and 58 by driving a pin 70 through the aligned openings 62 and 64, and 68 in the brackets and stud base, respectively.

The pivot pin 70 is offset in the stud base 66 such that the stud rotates in one direction (note dotted position A of support arm 12 (FIG. 1)). The location of the pivot pin 70 and the cubical configuration of the stud base 66 keeps the support arm 12 from rotating in the opposite direction. The stud 52 is provided with a plurality of pin receiving openings 72 extending through the stud and spaced along the axial length of the stud.

The other arm portion includes a hollow pipe or tube 74 which slidably surrounds the stud 52, the inside diameter of the tube 74 being slightly larger than the outside diameter of the stud 52. The pipe 74 can be extended from the stud base 66 and held in a plurality of positions by any suitable means. For example, a plurality of aligned openings 76 can be provided in the wall 78 of the tube 74. The aligned openings 76 are preferably aligned with the stud openings 72. The support arm 12 is held in retracted or extended position by aligning a pair of the aligned tube openings 76 with a stud opening 72 and driving a pin 80 through the aligned openings.

When using the pallets for supporting natural rubber, it has been found desirable to be able to extend the support arms such that the distance between the upper and lower panels can be varied from about 4 feet 10 inches to about 6 feet 8 inches. It has been found that stacking the natural rubber any higher leads to fusion of adjacent pieces of rubber.

The upper panel 10 is removably mounted on the free ends of the support arms by any suitable means. For example, the free or extended end 82 of the tube 74 is threaded. An abutment on which the panel 10 rests is formed by threadably engaging a nut or washer 84 on the pipe end 82. The upper panel 10 is mounted on the support arms such that its web 30 rests against the washers 84, the threaded pipe ends 82 extending through the openings 44–50 in the panel web 30. Another washer or nut 86 is threaded on the pipe end 82 and tightened against the web 30 of the upper panel 10. Thus, the upper panel 10 is securely clamped between the lock nuts 84 and 86.

Any suitable means can be provided for securing a ship's gear, e.g. a crane (not shown), to the pallet 6. For example, an eye-bolt 88 is slidably mounted within the threaded pipe end 82 by any suitable means, e.g. the bolt shank 90 extends through an opening 92 in a disc 94 which is secured in the bore 95 of the threaded tube end 82. The bolt shank 90 reciprocates within the disc opening 92 between the eye 96 of the bolt and an abutment 98 on the other end of the bolt shank 90. When not in use the eye-bolt 88 is within the pipe 74 and not subject to damage when a plurality of the panels 6 are nested or stacked (FIG. 3). When hooked to the lines of the ship's gear, the eye-bolt 88 is in an extended position B (FIG. 2).

The pallets can be dimensioned to permit stacking or nesting the pallets as illustrated in FIG. 3. This can be accomplished in a number of ways. For example, assuming the upper and lower panels are square, the inside dimension W of the upper panel 10 can be slightly larger than the overall dimension $W_1$ of the lower panel 8. When nested together, the lower panel 8 fits within the depending flanges 32–38 of the upper panel 10. In this way, the pallets can be stacked with comparative ease.

It should be noted at this point, that the support arms 12–18 are designed to rotate counterclockwise, as indicated by the location of their pivot pins 70. This particular arrangement for rotating the support arms helps to strengthen the pallet 6 by keeping the material supporting surfaces or panels 8 and 10 from moving relative to each other. In other words, the support arms would not have a tendency to collapse which would be the case, for example, if all the support arms were to rotate towards the right, as movement of the upper panel 10 towards the right would accelerate rotation of the support arms.

The pallets 6 can be strengthened by providing pairs of conventionally-designed cross struts or braces 100 and 102, between adjacent support arms. Cross bracing can be provided in each of the four bays, e.g. bay 103 formed by adjacent support arms 12 and 14, and the upper and lower panels.

Referring more particularly to FIG. 4, there is shown a plurality of stacked collapsed pallets 6. Each pallet 6 is collapsed or broken down by first removing the upper material supporting panel 10. This is accomplished by removing the lock nuts 86 from the threaded tube ends 82. The washers 84 are threadably disengaged from the tube end 82 after the upper panel 10 has been removed. The The extensible and retractable support arms 12–18 are rotated such that they rest against the web 20 of the lower panel 8. The upper panel 10 is then turned over and placed on, and fastened to the lower panel 8 by any suitable fastening means generally indicated at 106. In this manner, the empty panels are collapsed, stacked and returned for reuse. A great deal of space is saved by collapsing the pallets rather than returning them in their fully extended position (FIG. 3).

The pallets are dimensioned such that they can be used in railroad cars, truck bodies or holds of cargo ships with a minimum amount of wasted space.

Loading and unloading the pallet

The pallets are loaded with natural rubber or any crushable or fusible material by first rotating the supporting arms to their upright or outstanding position. Globs or pieces of natural rubber are then layered or stacked on the web 20 of the lower panel 8, the globs of rubber being stacked in height such that the pressure on the lowest piece of rubber is not sufficient to fuse that piece with the next adjacent piece. The support arms 12–18 are then extended and locked in position such that the upper panel 10 is mounted on the support arms free of the stacked globs of rubber. If only one pallet in height is used, i.e. a plurality of pallets are not stacked or nested, globs of rubber are then piled on the upper panel 10. This stacking operation can be done, for example, within or without the hold of a cargo ship for carrying the palletized rubber to a port of debarkation. Upon arrival at this port, the pallets are sequentially removed from the ship's hold and either placed in railroad cars or trucks for further transporting, or unloaded. The upper panel 10 of each pallet is unloaded and then removed. After the lower panel 8 is unloaded, the support arms are collapsed. The upper and lower panels are then fastened together, and the empty pallet returned, for example, back to the hold of the ship for restacking with other collapsed pallets.

Thus, there has been provided a new and novel pallet having at least one pair of parallel material supporting panels held in spaced relation by a plurality of collapsible support arms. The support arms are further retractable and extensible such that the space between the material supporting panels can be adjusted. The upper panel is detachably mounted on the support arms. The pallet is easily collapsed by removing the upper panel, collapsing the support arms and restraining the upper panel on the lower panel by locking or securing the panels together with the collapsed support arms therebetween. The area occupied by the collapsed pallet is substantially less than that of a fully extended pallet and more empty pallets can be returned in less space to greatly reduce the cost of transporting empty pallets.

What is claimed is:
1. A collapsible pallet comprising in combination:
  (a) a first and a second material supporting panel spaced from each other;
  (b) a plurality of extensible and retractable arms collapsibly mounted on the first panel for supporting the second panel in a plurality of positions relative to the first panel, each of the arms including two arm portions, one of the arm portions being pivotally mounted on the first panel, and the other of the arm portions being movable relative to the pivotally mounted arm portion;
  (c) means coacting with the arm portions for holding the movable arm portion in a plurality of extended positions relative to the pivotally mounted arm portion; and
  (d) means coacting with the second panel for detachably mounting said panel on the support arms.
2. The pallet of claim 1, which includes:
  (e) means for pivotally mounting said arm portion on the first panel, said means including:
    (1) a pair of parallel brackets secured to, and extending from the first panel; and
    (2) a pivot pin for extending through aligned openings in said arm portion and brackets, around which said arm rotates, said pin passing through said arm portion such that said arm portion can only rotate in one direction.

3. The pallet of claim 2, wherein the movable arm holding means (c) includes:
(f) a plurality of openings extending through both arm portions, at least one opening in one of said arm portions being alignable with the openings in the other of said arm portions; and
(g) a pin for extending through the openings in both arm portions when openings therein are aligned, said pin holding the movable arm portion in an extended position relative to the pivotally mounted arm portion.

4. The pallet of claim 3, wherein the material supporting panels are dimensioned such that a plurality of similar pallets can be stacked one on top of the other.

5. The pallet of claim 4, which includes:
(h) means coacting with at least one of the material supporting panels for receiving the arms of fork lift equipment.

6. The pallet of claim 5, which includes:
(i) means coacting with the pallet for detachably securing the pallet to a ship's gear.

References Cited

UNITED STATES PATENTS

| | | | |
|---|---|---|---|
| 1,431,823 | 10/1922 | Leconte | 108—111 X |
| 1,742,384 | 1/1930 | Fitzgerald | 108—51 X |
| 1,891,393 | 12/1932 | Oppenlander | 108—111 |
| 2,443,684 | 6/1948 | Lazarus | 108—53 X |
| 2,523,271 | 9/1950 | Bartel | 108—53 |
| 2,556,611 | 6/1951 | Borgman | 108—144 X |
| 2,585,111 | 2/1952 | Graver | 108—144 X |
| 2,699,911 | 1/1955 | Chase, et al. | 108—53 |
| 2,956,763 | 10/1960 | D'Area | 108—53 |
| 3,013,922 | 12/1961 | Fisher | 264—45 |
| 3,124,627 | 3/1964 | Hood | 264—45 |
| 3,152,199 | 10/1964 | Roberts | 264—45 |
| 3,177,271 | 4/1965 | Slayman | 264—45 |
| 3,193,093 | 7/1965 | Hansen | 108—53 X |
| 3,207,095 | 9/1965 | Hiatt | 108—53 |

DAVID J. WILLIAMOWSKY, *Primary Examiner.*

FRANK B. SHERRY, *Examiner.*

G. O. FINCH, *Assistant Examiner.*